Sept. 13, 1932.  W. LOWE  1,877,185
SCRIBING TOOL AND T-SQUARE FOR MECHANICS
Filed Feb. 8, 1929
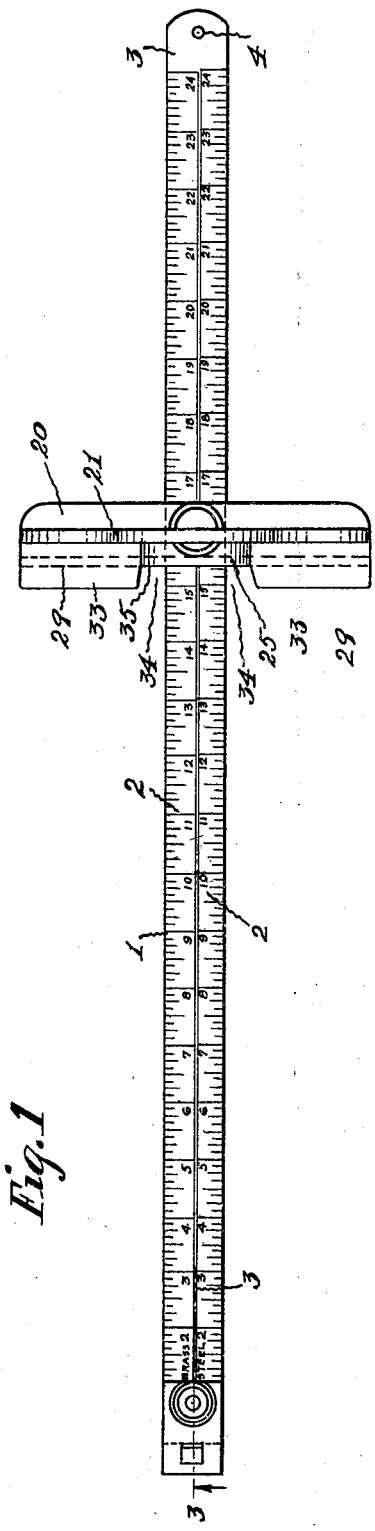
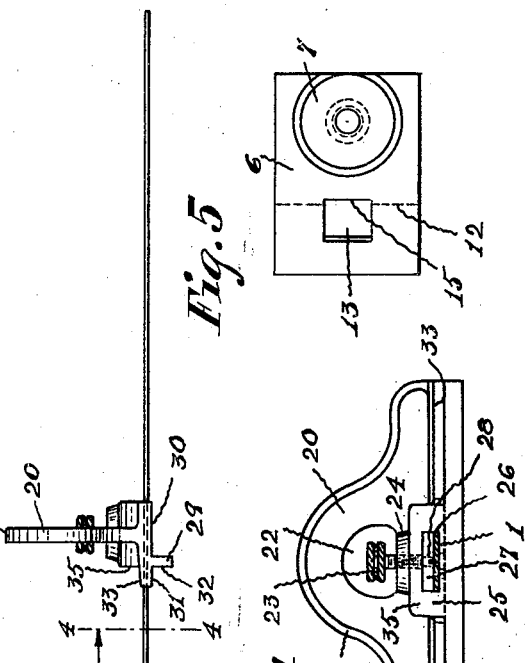
INVENTOR
*William Lowe,*
BY
*Harold D. Penney*
ATTORNEY Patented Sept. 13, 1932

1,877,185

UNITED STATES PATENT OFFICE

WILLIAM LOWE, OF PLAINFIELD, NEW JERSEY

SCRIBING TOOL AND T-SQUARE FOR MECHANICS

Application filed February 8, 1929. Serial No. 338,376.

My present invention relates to an improved scale gage, T-square and scribing tool, and while adaptable for use by mechanics generally, it is mainly adapted for pattern maker's use.

One of the important features of my device is in the provision of auxiliary means to be used with a standard steel rule, in the present instance a so-called pattern maker's shrink rule, whereby to permit the owner of such standard scale or rule to adapt it for the purposes hereinafter outlined, thus obviating the necessity of purchasing an added rule, in order to accomplish the desired ends. This makes for economy as most mechanics already have supplied themselves with such a standard rule as a part of their shop kit and, by the purchase of the added parts herein disclosed, the kit rule serves a dual purpose of rule and scriber, at a small outlay.

Another advantage relates to the parts supplied for this purpose wherein without any radical change to a kit rule other than, perhaps in some instances, the drilling of a small hole in said rule, near one end, the finished dimensions of such manufactured stock rule act as precise scriber positioning means whereby to insure accuracy of the scriber or T-square head coacting means.

These and other advantages will be apprehended as the herein description proceeds and it is obvious that modifications may be made in the structure herein disclosed without departing from the spirit thereof or the scope of the appended claims.

In the drawing:

Fig. 1 is a plan view of my improvement attached to a standard pattern maker's scale.

Fig. 2 is a side elevation thereof.

Fig. 3 is a sectional view of the scriber member taken on the line 3—3, Fig. 1, looking in the direction of the arrow.

Fig. 4 is a front sectional view of the adjustable T-square head, taken on the line 4—4, Fig. 2, looking in the direction of the arrow.

Fig. 5 is a plan view of the scriber holding element with the scriber and wedge block removed.

In Fig. 1, 1 represents a standard steel scale which may be readily bought in the open market and is used by mechanics generally, this scale being usually about two feet long and graduated on both sides by scale markings 2. In the present instance two sets of scales are shown on adjacent opposite edges of the face. The outer end of the scale 3 is provided with a blank space and has a hole 4 therein to permit it to be hung on a nail when not in use or not in the kit.

In Figs. 1 and 2 the dimension portion of the scale, that is from one inch to twenty-four inches, commences from the left hand side of Figs. 1 and 2, and from the front edge 5 of the scale, Fig. 2, and, as described, this scale is standard from the precise ground end of the scale 5, and the scale graduations thereon start from this edge 5.

In order to more clearly show the method of attachment of my scriber head to a scale of this kind, there is shown in Fig. 3, in enlarged section, a scale 1, upon which is mounted a scriber head 6 which comprises a substantially rectangular piece of the proportion shown in Fig. 5, the same being provided with an upstanding boss 7 into which is threadedly mounted a threaded stud 8 which is provided with a knurled knob 9 at its upper end, the lower end of said stud being developed into a tapered unthreaded end 10.

The scriber element 6 is slotted with a slot 11 whereby to receive therein the front end of a scale 1 so that its precisionized ground end 5 may be entered a little more than half way back into said scriber element 6, the slot terminating at a line 12, Fig. 5, which acts somewhat in the nature of an abutting face for the end of the scale.

Near the terminus of this scale slot 11 there is located a tapering rectangular hole 13 which passes down through the thickness of the rear end of the scriber element 6 and into the front face of this slot is mounted a scriber blade 14 which rests against the vertical face 15 of the slot 13, the said scriber blade being of substantially the width of the slot 13 when in its operative position and being backed up and held against the face 15 by a scriber locking wedge 16 which, when forced into the slot 13, as shown in Fig. 3, adjustably locks the scriber blade so that its lower sharpened end 17 protrudes below the surface 18 of the structure any desired distance.

When the scriber element is assembled as described in the foregoing, the scale 1 is introduced into the slot 11, shown in Fig. 3, and pushed backwardly until its edge 5 contacts with the front face of the sharpened scriber blade 14 and by reason of an aperture 19 which, if not already in the scale, may be drilled therein, the threaded member 8 is screwed down until the tapered end 10 thereof strikes against the edge of the hole 19 and forces the scale backwardly until its precision edge 5 is in lockable engagement with the front face of the scriber 14 and is thereby held in absolute square and rigid position but is easily removed therefrom when desired.

The wedge member 16 may be removed at any time to sharpen the scribed blade 14 at 17 or to adjust the depth of projection of the scriber blade below the bottom face 18 of the scriber element.

As a means for cooperating with the scriber blade to enable a mechanic to scribe a line at any desired distance, there is provided a vertically slidable T-headed member 20, in Figs. 1, 2 and 4, the same being provided with an upper grip portion 21 whereby to render it easily handled and this is provided with an opening 22 therein, Fig. 4, of sufficient dimensions to permit the introduction therein of a knurled head of a thumb screw 23, there being a boss 24 provided upon the top of a substantially rectangular guide boss 25, having a rectangular aperture 26 of the same width as the scale 1 but considerably larger, in the vertical direction, so as to permit the introduction therein of a pressure gib 27, into which the unthreaded reduced end 28 of the thumb screw 23 may be introduced.

The raising or lowering of the thumb screw causes the pressure gib 27 to rise or fall therewith and when the scale 1 is in operative position, as shown, the scale may be lockably engaged to the T-head 20 in any desired gage distance from the front face of the scriber blade 14.

As indicated in Fig. 2, the lower face of the T-head is provided with a downstanding rib 29 which is precisely machined on all of its sides, which rib 29 extends entirely across the lower face 30 of the T-head so that the faces 31 and 32 may be utilized as a square edge against which to rest the T-head upon any surface that is being scribed during use of the device.

As indicated in Fig. 1, a portion of the ledge 33, the lower face 31 of which forms with ledge 29 a squaring face for use of the device, is cut away as at 34, Fig. 1, thereby to expose the front face 35 of the boss 25 so that face 35 and the face 32 are flush with one another and permit a reading of the index of the scale, as indicated in Fig. 1, when the T-head 20 is in any adjusted position distant from the scriber point 17.

Thus, it will be noted that I have provided an adjustable device usable upon a standard rule whereby the precisioned front edge 5 of the scale may be used as a base for reading the adjustable dimensions of a scriber of this kind when assembled as above outlined.

It will also be noted that by the removal of the scriber element 6, from the end of the scale, that the scale itself, in combination with the head 20, may be utilized as a T-square, and at the same time obviate the necessity of buying a separate scale, thereby permitting the use of a standard scale equipment in the kit of the user.

Having thus described my invention, what I claim is:

1. In a device of the class described an elongated body, having thereon a rule receiving slot, said slot being disposed lengthwise of said body, means for removably locking said body to a rule, an adjustable metal scriber blade carried by said body, said blade being centrally positioned at said slot, and a locking wedge on said body for adjustably locking said blade in position at said slot.

2. In a device of the class described comprising a rule having therein an aperture and including a precisioned end, a body having therein a threaded aperture for alignment with said first aperture, said body having also therein an opening and a communicating rule receiving slot, a scriber disposed in said opening and abutting said end, and threaded means disposed in said second aperture and having a tapered end in movable engagement with the boundary wall of said first aperture, whereby to urge said first end into locking engagement with said scriber on turning said means.

3. A T-head for a rule, comprising a body having therein an elongated rule receiving guideway, a flat upper grip portion on said body, said portion having therein an opening and being located perpendicularly to said guideway, and a means for locking the body to a rule, said means including a screw having thereon a head, said head located in said opening.

4. In a device of the class described comprising a rule having adjacent one of its ends an aperture, a body having therein a threaded opening, and a slot for receiving said end, said body having therein a second slot, which latter communicates with said first slot, a scribing tool positioned in said second slot and engaging said end, and manipulable means revolvably disposed in said threaded opening and having a plain tapered terminal disposed in said aperture, whereby on revolving said means said terminal is effective to urge said end against said tool for holding the latter.

5. In a device of the class described comprising a rule having adjacent one of its ends an aperture, a body having therein a threaded opening, and a slot for receiving said end, said body having therein a second slot, which latter communicates with said first slot, a scribing tool positioned in said second slot and engaging said end, a wedge also disposed in said second slot and engaging said tool, and manipulable means revolvably disposed in said threaded opening and having a plain tapered terminal disposed in said aperture, whereby on revolving said means said terminal is effective to urge said end against said tool for holding the latter against said wedge.

6. In a device of the class described comprising in combination a rule having a precisioned end, said rule having an aperture adjacent said end; a body having therein a threaded opening and having also a slot for receiving said end, said body having therein a second slot, which latter communicates with said first slot, a scribing tool positioned in said second slot and engaging said end, and manipulable means revolvably disposed in said threaded opening and having a plain tapered terminal disposed in said aperture, whereby on revolving said means said terminal is effective to urge said end against said tool for holding the latter.

Signed at Plainfield, in the county of Union and State of New Jersey, this 28th day of January, A. D. 1929.

WILLIAM LOWE.